United States Patent [19]
St. Louis

[11] Patent Number: 5,954,970
[45] Date of Patent: Sep. 21, 1999

[54] PROCESS FOR TREATING SLUDGE USING LOW-LEVEL HEAT

[75] Inventor: Daniel M. St. Louis, MaComb, Mich.

[73] Assignee: Haden Schweitzer Corporation, Madison Heights, Mich.

[21] Appl. No.: 08/371,123

[22] Filed: Jan. 11, 1995

[51] Int. Cl.[6] .................................................. C02F 11/14
[52] U.S. Cl. .............................. 210/710; 34/259; 34/338; 203/47; 159/47.3; 210/712; 210/718; 210/729; 210/737; 210/748; 210/770; 210/930
[58] Field of Search ............................... 34/259, 264, 265, 34/305, 338, 340; 210/609, 710, 712, 718, 725, 727, 728, 729, 737, 751, 770, 771, 930, 748; 159/47.3; 203/47

[56] References Cited

U.S. PATENT DOCUMENTS

| | | | |
|---|---|---|---|
| 3,523,076 | 8/1970 | Goerz et al. | 210/609 |
| 3,831,288 | 8/1974 | Stribling et al. | 34/1 |
| 4,184,956 | 1/1980 | Azam et al. | 210/103 |
| 4,193,869 | 3/1980 | Brucker et al. | 210/195.1 |
| 4,242,220 | 12/1980 | Sato | 34/4 |
| 4,312,759 | 1/1982 | Sherwood et al. | 210/770 |
| 4,592,291 | 6/1986 | Sullivan | 110/346 |
| 4,980,030 | 12/1990 | Johnson et al. | 203/4 |
| 5,003,143 | 3/1991 | Marks et al. | 422/285 |
| 5,037,560 | 8/1991 | Gayman | 210/751 |
| 5,091,079 | 2/1992 | Gayman | 210/175 |
| 5,174,864 | 12/1992 | Arbizzani et al. | 202/175 |
| 5,200,085 | 4/1993 | Rudolf et al. | 210/771 |
| 5,229,010 | 7/1993 | Fluchel | 210/748 |
| 5,256,308 | 10/1993 | Dulany | 210/712 |
| 5,280,149 | 1/1994 | Schneider et al. | 588/237 |

*Primary Examiner*—Peter A. Hruskoci
*Attorney, Agent, or Firm*—Niro, Scavone, Haller & Niro

[57] ABSTRACT

The present invention describes a process and an apparatus for treating sludge having both liquid and solid constituents. The sludge is first heated to a minimum optimum draining temperature. During heating, mechanical dewatering of the sludge occurs. In a preferred embodiment, a process is disclosed for treating waste paint sludge generated from a paint spraybooth, and heating is performed using microwave radiation. Liquid released from the paint sludge during dewatering can be recycled back to the spraybooth water, and vaporized exhaust generated during heating can either be condensed into liquid form and recycled, or incinerated and, preferably, sparged through untreated sludge to pre-heat it.

12 Claims, 3 Drawing Sheets

PROCESS FOR TREATING SLUDGE USING LOW-LEVEL HEAT

BACKGROUND OF THE INVENTION

The present invention relates to a method for treating industrial or sanitary waste sludge having both solid and liquid components. The present invention is, more specifically, disclosed in the context of its preferred embodiment, which relates to a method for processing waste paint sludge from a painting operation, to dry it, remove volatile organic compounds, substantially reduce its weight and volume and, ultimately (in some cases), to produce a recyclable product.

The disclosures of U.S. Pat. Nos. 4,980,030, 4,750,274, and 4,222,319, as well as Haden's copending patent application, Ser. No. 08/371,358, titled "Method for Drying Paint Sludge and Raw Paint," filed on Jan. 11, 1995, are incorporated by reference into this application.

Recently, increasing environmental concerns and federal regulations have sought to limit the type and quantity of waste generated by various industries, including sanitary and industrial waste sludge, as well as sludge generated by the automotive paint industry. In response to this problem, manufacturers have developed various methods for treating sludge, including automotive paint sludge, and creating useful byproducts from it.

When an automobile is painted in a paint booth, the excess paint solids are collected beneath the paint booth, typically in a wet booth or a water-wash system. The material recovered from such processes, either by chemical separation, membrane technology, filtration, or scrubbing, is known as paint sludge.

It will be appreciated by those skilled in the art that the waste paint sludge treated in accordance with the present invention is a complex material and is different from most other waste sludges. First, such sludge includes volatile organic compounds ("VOC's"), such as thinners, solvents and detackifying agents. Second, such sludge includes uncured polymeric paint resins that can "cure" or cross-link upon the heating and volatilization of the constituent liquid components. Thus, paint sludges can become very sticky when dried. Third, paint sludges can include inorganic pigments and heavy metals. These components are often hazardous and/or toxic.

Disposal of paint sludge is a problem of considerable complexity that faces paint booth operators. Currently available disposal technology is based upon the principles of incineration, chemical and physical treatment, and solidification, as discussed in U.S. Pat. Nos. 4,980,030 and 4,750,274.

Prior art methods for drying paint sludge have relied on traditional heating methods applied to a mixing machine. The sludge is stirred constantly and heated until all of the water initially present in the sludge is driven off. The remaining paint solids can then be heated further to cure the remaining paint resins, with the object of providing a dry powder. Two types of machines are known to perform this heating process. One, the assignee's own DRYPURE® drier, is a hollow flight screw mixer heated with hot oil, the use of which is described in U.S. Pat. No. 4,750,274. Another known commercial system, sold by Salem Engelhardt, utilizes a rotating tray dryer, which is believed to be heated by natural gas.

While DRYPURE® has met with some commercial success, both types of machines are susceptible to the operational problem that, after the water is removed, the paint sludge can solidify into a single hard mass that can lock up the machine. Removal of the hardened material is difficult and time consuming. The inventor has discovered that the solidification problem can be avoided to some extent by chemical pretreatment of the sludge, as disclosed in Haden's copending patent application, Ser. No. 08/371,358, titled "Method for Chemically Treating Paint and Paint Sludge."

Another problem with these known thermal drying techniques is that they require a great deal of energy. Most of the energy used to dry the sludge is required to boil off the water in the sludge. Since each pound of water, once it first reaches 212° F., requires an additional approximately one thousand BTUs to be boiled off, and paint sludge typically contains about 75% water, those in the art will readily appreciate that a significant amount of energy is required to vaporize the water within the paint sludge.

A further problem with known thermal techniques for drying paint sludge is that, as the percentage of sludge solids increases, it becomes increasingly more difficult to remove water from the sludge. Conventional thermal techniques dry sludge by heat conduction, and sludge solids tend to inhibit this heating process as their relative concentration increases. This is due to the fact that sludge is a good insulator or, conversely, a poor heat conductor. Therefore, with conventional thermal dryers transferring heat into the sludge becomes progressively more difficult as the drying process continues.

A further problem with known thermal techniques is that these systems require significant warm-up times (up to two hours) and corresponding cool-down times, due to their larger thermal mass. For example, with the screw mixer disclosed in U.S. Pat. No. 4,750,274, the "thermal mass," (i.e., the mass that must be heated to heat the sludge), includes a good deal of mass unrelated to the sludge, including the oil tanks, piping, jackets containing oil, etc.

The present inventor has found, through experimentation, that when sludge is heated, preferably up to about 212° F., by any means, most of the water within the sludge is easily released by mechanical dewatering. For example, the inventor has found that for sludge initially including 23% solids, about two-thirds of the water drains off readily after heating the sludge to about 212° F. using only gravity to induce the draining. As those of skill in the art will readily appreciate, draining the sludge liquid is far more economical, in terms of power consumption, than boiling it off from the sludge solids. For example, heating one pound of water from 70° F. to 212° F., without vaporization, requires about 142 BTUS. However, due to the latent heat of vaporization, heating one pound of water from 70° F. to 212° F., and then vaporizing the water, requires about 1112 BTUs—nearly nine times the energy.

The present inventor has also found that, contrary to known heating methods, the sludge should not be stirred during heating. The less stirring or agitation the paint sludge undergoes as it dries, the less likely it is to solidify or "go plastic." Further, it has been found that no mixing or stirring during heating yields the best drying results, regardless of the heating method employed. The inventor believes that the reason for this is that the shear force exerted on the detackifiers present in the paint sludge during stirring displaces the detackifiers and exposes the raw paint particles. Continued stirring is then thought to encourage conglomeration of the naturally sticky paint particles.

Another disadvantage of known sludge processing techniques is that they typically operate in a "continuous flow"

manner, so that a stoppage of one operation locks up the entire system. When sludge "plasticizes," it will be appreciated that the "continuous flow" system can be a serious disadvantage.

A further problem associated with known thermal techniques is their relatively high operational and maintenance costs.

Accordingly, an improved thermal technique for drying paint sludge in an economic manner is needed.

SUMMARY OF THE INVENTION

The present invention provides a process for treating industrial or sanitary sludge having both liquid and solid constituents. The sludge is initially heated to a minimum optimum draining temperature. The sludge is then mechanically dewatered while its temperature is maintained at the minimum optimum draining temperature. Continued heating of the sludge at a temperature at or above the minimum optimum draining temperature now permits the volatilization of remaining liquid constituents.

During the heating while dewatering steps, the sludge can be housed within an open container, which can be placed within a large microwave oven or chamber. Preferably, the sludge is heated to 212° F. and brought to boiling, at least for a few seconds. The sludge is then preferably maintained at a minimum optimum draining temperature during dewatering. Following dewatering, heating of the sludge preferably continues at an elevated rate until most or all remaining liquid is removed and vaporized.

In a preferred embodiment, the oven floor is designed to reflect any microwave radiation striking it vertically upward, to avoid further heating of sludge liquid which has drained into a containment area. In a particularly preferred embodiment, the open container includes a porous and disposable liner, so that if the sludge solidifies, it can be easily taken off-line for further treatment.

Various alternative steps may also form a part of the present invention. For example, any vaporized exhaust from the oven may be incinerated and released to the atmosphere. Preferably, however, the exhaust is sparged through untreated sludge prior to its drying, to preheat the untreated sludge and conserve heat energy from a prior drying treatment. Also, the dry or siemi-dry sludge solids can be crushed prior to recycling or other use, including use as landfill or fertilizer.

In the particularly preferred embodiment, a process is disclosed for treating waste paint sludge generated from a paint spraybooth. The treatment process is similar to that already described for industrial or sanitary sludge in general. In addition, various alternative steps can also be performed on the waste paint sludge. For example, the waste paint sludge can be treated with a chemical, such as a surfactant, prior to the drying step to enhance detackification of the sludge. As another example, the drained paint sludge liquid can be recycled from the containment area back to the booth water of the paint spraybooth.

As with industrial or sanitary sludge in general, vaporized exhaust from the paint sludge, generated during the heating step, can be sparged through untreated paint sludge to preheat the untreated sludge and conserve heat energy from a prior drying treatment. A further step can include condensing the vaporized exhaust from the paint sludge into liquid form to minimize effluent gases containing, for example, VOCs.

An apparatus for treating sludge is also disclosed. In the particularly preferred embodiment, an apparatus is disclosed for treating waste paint sludge from a paint spraybooth. The apparatus includes a container with a disposable and porous liner for housing the paint sludge, and a microwave oven or chamber. The container is placed within the oven, and the sludge is heated to a minimum optimum draining temperature. Mechanical dewatering of the sludge preferably occurs while the container of sludge is still within the oven. During dewatering, the temperature of the sludge is maintained at the minimum optimum draining temperature through the use of at least intermittent microwave radiation. After dewatering, the sludge continues to be heated at or above the minimum optimum draining temperature to volatilize remaining liquid constituents. Oven exhaust can then be sent to an incinerator. Preferably, however, a substantial portion of the water vapor is first liquified in a condenser, and the reduced volume of exhaust can then be sent to an incinerator.

In a preferred embodiment, a containment area holds the sludge liquid generated during mechanical dewatering. The oven has a metal perforated floor which will prevent sludge liquid within the containment area from being subjected to any further substantial microwave radiation.

These and other objects and advantages of the present invention will become apparent to those skilled in the art from a reading of the following detailed description of the preferred embodiments and the appended claims.

BRIEF DESCRIPTION OF THE DRAWINGS

The novel features of the invention are set: forth in the appended claims. However, the preferred embodiments of the invention, together with further objects and attendant advantages thereof, will be best understood by reference to the following description taken in conjunction with the accompanying drawings in which:

DETAILED DESCRIPTION OF THE PREFERRED EMBODIMENTS

Figure 1:
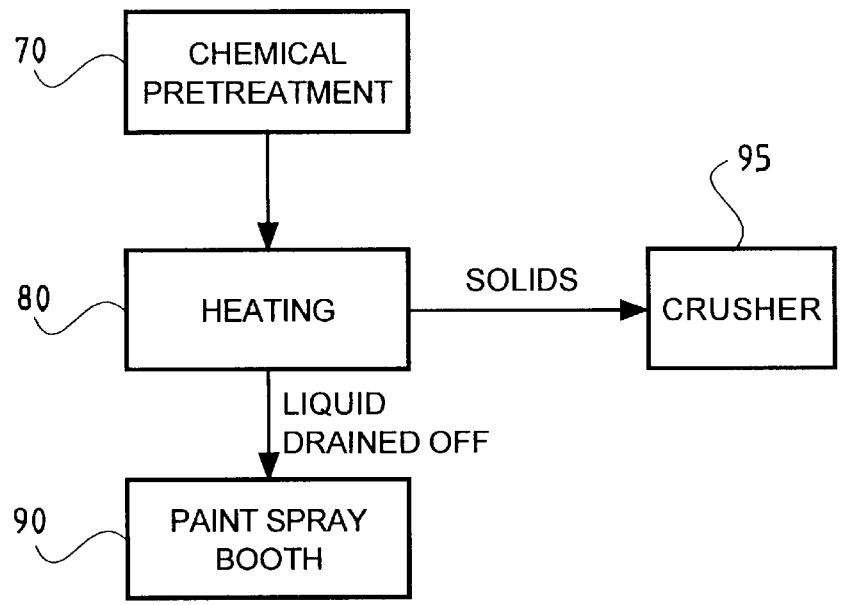
FIG. 1 is a block diagram of the various process steps which can form part of the present invention.

The basic treatment steps of the present invention are illustrated in block diagram form at FIG. 1. Thus, an optional chemical pretreatment step 70 is followed by microwave heating step 80. Liquid drained during step 80 can be conveyed to, for example, the booth water of a paint spraybooth facility (step 90), while dry or semi-dry sludge solids can be conveyed to a crusher (step 95). A more detailed explanation of these steps now follows.

Figure 2:
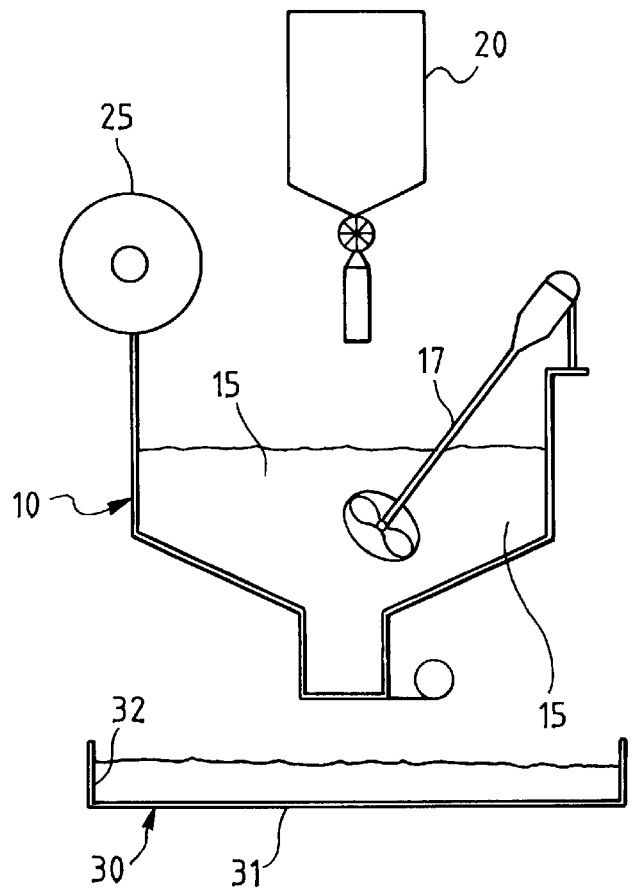
FIG. 2 is a diagrammatic view of the optional chemical pretreatment step of the present invention.
Figure 3:
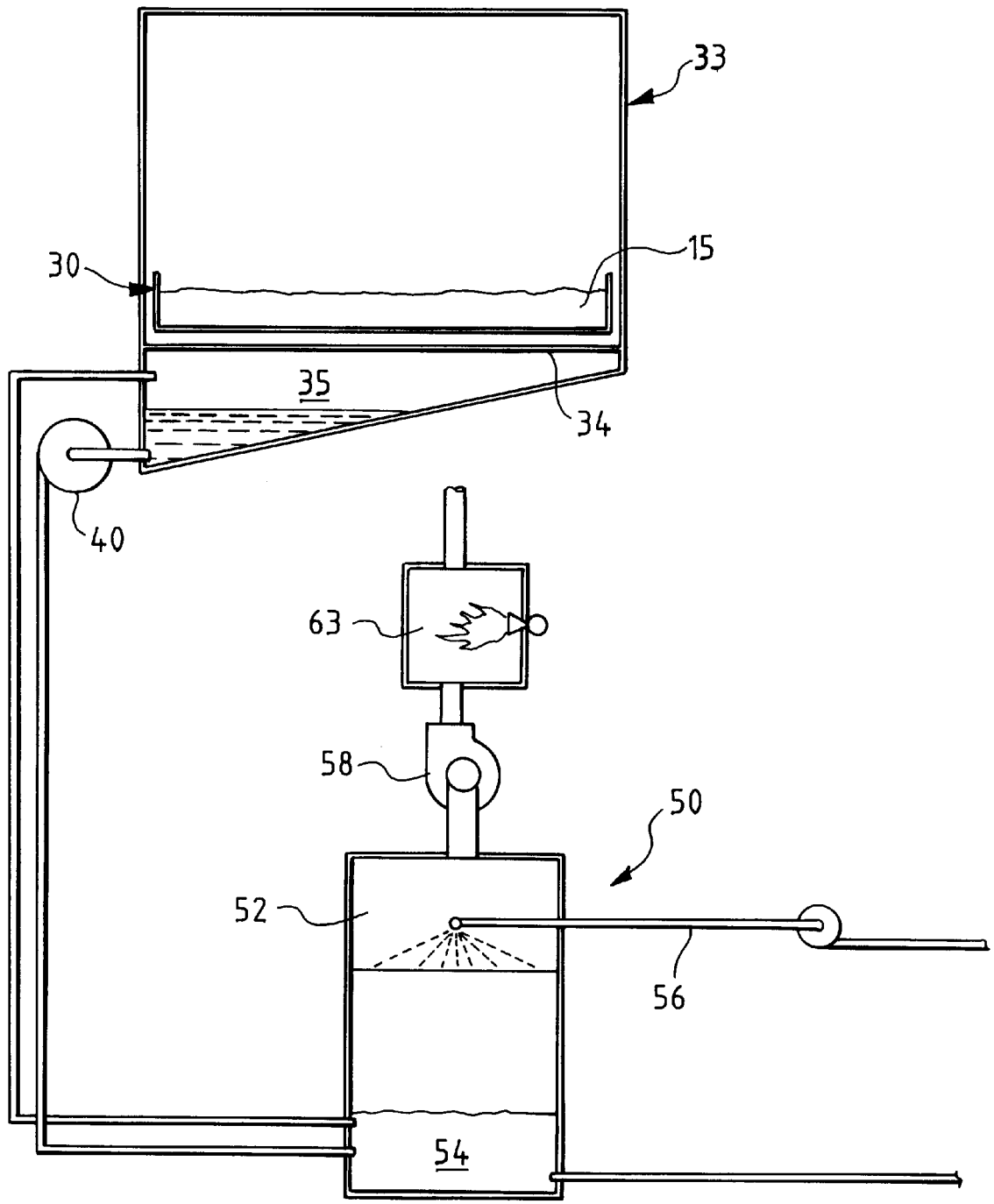
FIG. 3 is a diagrammatic view of the steps of microwave heating, mechanical dewatering and further treatment of the sludge constituents.

Referring now to FIGS. 2 and 3, the preferred embodiment of the present invention involves the treatment of a stream of waste paint sludge generated by a paint spraybooth, designated generally as 50. (The use of a paint spraybooth is described, for example, in U.S. Pat. No. 4,222,319.) Initially, a strainer consisting of a porous cylinder which slowly rotates, such as rotc, strainer 25, can be used to lift off the "raft" of paint sludge floating on the surface of the booth water, and drop the sludge into a hopper or mixer 10 for housing the waste paint sludge 15. The hopper may include a paddle 17 or other means for mixing chemicals, such as surfactants, into the paint sludge, through the use of chemical dispensing mechanism 20.

Chemical pretreatment, as disclosed in Haden's copending application filed on the same day as this application, U.S. Ser. No. 08/371,358 and titled "Method for Chemically Treating Paint or Paint Sludge," is not a necessary step of the present invention. However, chemical pretreatment has been found to be very useful when the operator believes he/she will be working with a sticky sludge, such as may be found when sludge pit clean-out occurs and the bottom sludge residue of the booth water of a paint spraybooth is treated. As disclosed in Haden's copending application, it is particularly preferred to use a surfactant, 2% by weight. Anionic surfactants, nonionic surfactants and amphoteric surfactants are believed to be the active ingredients which facilitate pretreatment of the sludge here. A particularly preferred embodiment found to be effective is a household liquid dishwashing detergent such as DAWN®. Alternatively, DURALUBE®, a motor oil additive which is believed to have a similar reactive chemistry to that found in liquid detergent, has been found effective. However, motor oil additives contain a greater percentage of VOCs than detergents, and are therefore not preferred.

Referring now to FIG. 2, following any optional chemical pretreatment, the paint sludge is now heated. While there are many well known methods for heating sludge, such as the heat conduction method disclosed in U.S. Pat. No. 4,750,274, the use of microwave radiation has been found preferable. In the preferred embodiment of the present invention, the paint sludge is placed in drying tray 30 which includes liner 32. Drying tray 30 has a metal perforated floor 31 which will allow mechanical dewatering (simple draining by gravity is disclosed here) of sludge liquids during heating, as discussed further below. Liner 32 consists of any suitably porous, disposal liner for retaining the sludge solids while permitting the sludge liquid to drain off under the influence of gravity. A preferred material for tray liner 32 is a fiberglass cloth having a burlap texture.

Referring now to FIG. 3, tray 30 containing paint sludge 15 is next placed in a large microwave oven or chamber 33. Oven 33 includes perforated floor plate 34. Perforated floor plate 34 of oven 33 serves two functions. First, it permits any sludge liquids generated during drying to drain to trap area 35. Second, plate 34 takes microwaves that may be moving in a downward direction and reflects them back in an upward direction. This ensures that microwave energy is not being wasted, such as to heat water which has already drained from tray 30.

The paint sludge within tray 30 is now subjected to microwave radiation. Preferably, the sludge is heated to about 212° F., and the sludge liquid is boiled for at least a few seconds. The inventor has found that this will enhance both detackification and dewatering of the sludge. Now, while preferably maintaining the sludge at about 212° F., but without the need for heating the water to vaporization, a significant portion of the sludge liquid can be drained in a relatively rapid fashion, under only the influence of gravity. The liquid is drained through porous liner 32 and perforated plate 34, and into a containment or trap area 35.

Continued heating of the sludge following dewatering, preferably at a temperature of about 212° F., will vaporize any remaining water within the sludge. In order to volatilize any remaining water vapor and VOCs, and to cure sludge resins remaining after dewatering, the sludge temperature can now be raised by microwave or other heating methods to about between 270°–300° F.; lower or even higher temperatures may be used, given different types and conditions of sludge.

Depending on the intended use for the treated sludge, it may not be necessary to heat the sludge any further following dewatering. For example, the treated sludge may be suitable for use as landfill, despite the presence of as much as 15–30% in water content, by weight. However, it may be preferred to further heat the sludge following dewatering remove all of the liquid water within the treated sludge, and thus minimize the shipping weight of the sludge if it is used (for example) as landfill.

Mechanical dewatering of the sludge can be accomplished in any manner as is well known. For example, with certain Sludges it may be beneficial to perform mechanical dewatering using a press to compress the sludge and thereby forcibly remove the sludge liquids. However, simply allowing water which is naturally released from the sludge solids during heating to drain is the preferred dewatering process. In order to accelerate the dewatering process, negative pressure, such as a vacuum suction, is preferably applied to the bottom of the drying trays.

It should be understood that heating the paint sludge to 212° F. is not an absolute requirement, since beneficial dewatering results can be obtained below that temperature. Also, other types of sludges than paint sludges, containing different chemicals, may be capable of effective dewatering under even less heat. A "minimum optimum draining temperature" can be derived by heating a predetermined amount of sludge to be treated, and measuring the water drained from the sludge. This step can be repeated until the minimum optimum draining temperature is determined to within an acceptable error. This temperature is preferably based on the amount of draining that occurs for a given temperature, and cost considerations given power consumption requirements needed to maintain a particular sludge temperature. Given the lower thermal mass involved in microwave heating, and the latent heat of vaporization, the inventor believes that it will nearly always be cost efficient to heat the paint sludge to about 212° F. This is particularly true when it is realized that every pound of water which is drained represents about 1000 BTUs in energy which need not be expended to vaporize that pound of water.

Those of skill in the art may also find that other well known heating methods may be used in conjunction with, or to replace altogether, microwave heating. However, it is important that low-level heating (that is, heating below the volatilization point of the paint sludge) occur during dewatering, for energy efficiency reasons, as well as for other reasons given below.

Still referring to FIG. 3, paint spraybooth 50 includes packed spray tower scrubber/condenser 52, booth water pool 54, and a piping system for conveying and spraying booth water 56. Water and solvent vapor generated during spraying within the open area of scrubber 52 can be conveyed by blower 58 to incinerator 63, as is well known. Proper incineration of the vapor will allow it to resolve into pure hydrogen and carbon-dioxide constituents, which can be released into the atmosphere.

During drying, positive displacement pump 40 can be used to recycle the drained sludge liquid back to the booth water within paint spray booth 50. It will also be understood that since the drained sludge liquid will likely contain the relatively expensive chemicals, including detackifiers, needed for the booth water, this is an economical recycling event.

Microwave oven 33 may also contain a separate exhaust (not shown) for evacuating any vapors generated during drying. It will be understood that the inner environment of oven 33 will be maintained in a slight vacuum during drying. Oven vapors generated during heating can be incinerated and then also released to the atmosphere. Preferably, however, any exhaust (water vapor and VOCs) generated during the heating-during-dewatering treatment is suctioned down through drying tray 30 and separately-conveyed to a liquid condensing apparatus, such as scrubber/condenser 52. Suctioning can be accomplished by any well known means, including a vacuum. Following treatment in the scrubber, the percentage of water vapor within the exhaust will have greatly decreased. The condensed liquid can be recycled back as booth water. This will also minimize the amount of gases laden with VOCs, which are not easily recyclable. Further, this will permit the use of a smaller burner and a smaller incinerator. In fact, the treated VOC/vapor mix may be such that the burner may require little or no fuel to sustain combustion.

Following incineration, the exhaust can be released to the atmosphere. Preferably, however, the oven exhaust is sparged through untreated sludge to preheat the sludge, prior to its drying, thus recapturing some of the energy used to heat sludge which has already been processed.

Figure 4:
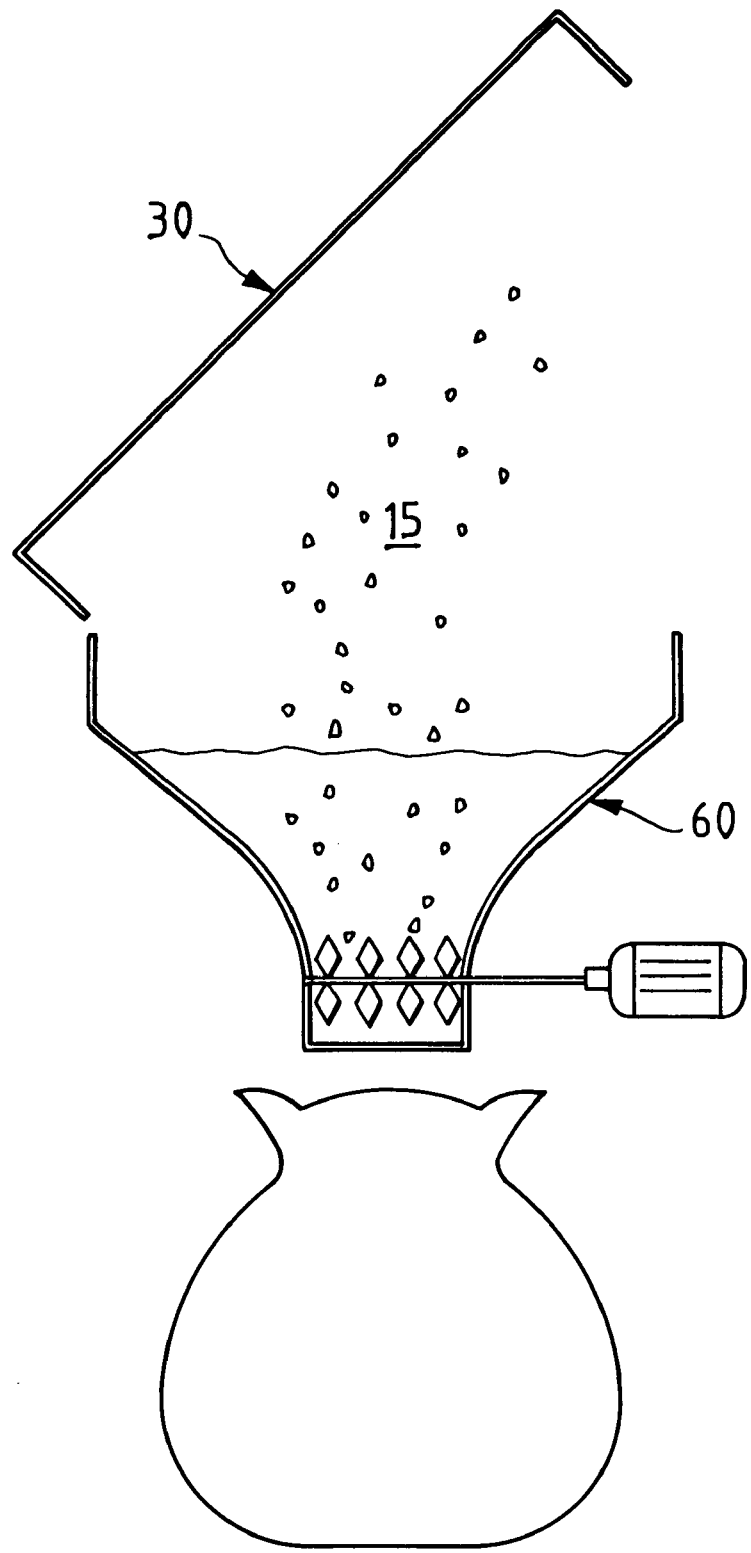
FIG. 4 is a diagrammatic view illustrating the crushing step, following the heating and dewatering steps, of the sludge solids.

Referring now to FIG. 4, once the sludge solids within tray 30 are deemed sufficiently dry, the sludge solids can be conveyed to crusher 60. Here, the sludge solids can be crumbled or pulverized by any means well known in the art. The dry or semi-dry sludge solids can then be conveyed for recycling to, for example, a landfill. If the sludge solids are to be used for a landfill, it will be appreciated that the sludge need not be completely dry.

Alternatively, it should be appreciated that if sludge treated by the present invention is processed to a dried powder, this product can be used as an ingredient for asphalt, concrete, mastics, sealants and similar materials. For example, slake lime or quick lime can be mixed with the dried powder, and it can be used as an asphalt filler. In order to serve as concrete aggregate, for example, it is of course desirable to reduce the particles of the dried powder to an appropriate size.

Sludge processed by the present invention also finds an advantageous use as fuel. Paint solids are typically composed of organic resins and inorganic pigments. The organic resins can be effectively used as fuel. Since the low-level heating, such as microwave heating, disclosed by the present invention enables the retention of a greater percentage of solids, and thus organic resins, sludge processed by the present invention is believed to find an effective use as fuel.

It should be appreciated that there are various aspects of the processes described by the present invention which are novel. For example, it is not believed to be generally known that paint sludge, when brought to a temperature at or near 212° F. and allowed to boil for a few seconds, will detackify and then, if left at that heat, will rapidly release the majority of water contained within the paint sludge through mechanical dewatering. It is also believed novel to heat the sludge without mixing, stirring or agitation.

Another novel aspect of the present invention is the use of at least intermittent microwave heating. Although sludge typically becomes a poor thermal heat conductor as it dries, it has been found that its ability to absorb microwave energy does not diminish as it dries. Thus, while other thermal drying techniques heat the sludge by conduction, and drying is slowed as sludge solids content (and its corresponding insulation ability) increases, the same does not occur with microwave heating. Microwave radiation will continue to penetrate the sludge solids, without reflection. Part of the novelty of the present invention is this recognition, coupled with the idea of mechanically dewatering the sludge during heating. Importantly, known thermal drying techniques teach away from simultaneous draining while drying. Conventional thermal dryers do not provide for simultaneous dewatering, which is accomplished as a separate step. See, for example, the statement in U.S. Pat. No. 4,980,030, col. 4, 11. 33–35 ("It is desirable to dewater the waste paint sludge as much as possible prior to employing the further [heating] steps of the method."). Simultaneous dewatering is particularly important in light of the inventor's finding that the ability to drain paint sludge dramatically increases when the sludge is heated to about 212° F., without the need for vaporization to occur.

It should be noted that microwave heating can continue after all water has vaporized, and the remaining paint sludge resins can even be boiled off (at temperatures up to and above 400° F.). However, those of skill in the art will appreciate that this may not be the most economical use of the present invention for any given use of the treated sludge.

Cost Analysis

A cost analysis of the present invention, in terms of power consumption per pound of paint sludge processed, is believed illustrative of the advantages of the present invention.

The inventor currently envisions the use of microwave ovens with dimensions of approximately seven feet long, seven feet wide, and five feet high. It is currently estimated that, given this oven size, a preferred paint sludge depth within tray 30 is about six inches, to optimize efficient microwave heating. Therefore, one tray would contain about one cubic yard of paint sludge, or about 1,620 total pounds of paint sludge, including about 1,215 pounds of water (assuming a 25% solids content). The inventor estimates the drying process will take about 45 minutes, roughly broken down as follows: (a) about 10 minutes to bring the water within the sludge to the boiling point; (b) about 5 minutes or less to drain the majority of water from the sludge about two-thirds of the water from the sludge (about 810 pounds); and (c) the remaining 30 minutes for further heating, to boil off the remaining approximately one-third of the water, the vapor of which may have to diffuse up through the sludge. Assuming 16 trays of sludge are treated per day, the daily power consumption of the microwave oven would be 2,880 kilowatts. In this fashion, using two ovens of similar size, 324,000 pounds of paint sludge could be treated at an annual power consumption of about 576,000 kilowatts, or at an annual energy cost of about $46,080. This amounts to an energy cost of about $0.14 per treated pound of sludge. It is believed that this energy cost is significantly lower than the energy costs of other paint sludge treatment systems using known thermal drying techniques.

Advantages of the Present Invention

Based on the foregoing description, a number of advantages of the present invention over known sludge processing methods should now be apparent, some of which will now be described. For example, due to the simplicity of the present invention, lower capital costs are involved. Also, microwave heating is more controllable than other known heating processes, since instant-on, instant-off, controls can be used, and less thermal mass exists. Thus, microwave heating permits a more precise control over the power used and time taken to heat the sludge than known thermal drying processes.

Additionally, as shown, the operating costs of the present invention over known sludge drying methods are lower. One reason for this is that little heat is wasted, since the sludge placed within the microwave oven is directly heated, and little heat escapes outside the oven. Also, due to the substantial amount of sludge liquids drained off, only a small fraction of the sludge liquid needs to be vaporized (an energy intensive task, as described above), in contrast to other prior art systems.

There are also recycling efficiencies realized by the present invention, as referenced above. Drained sludge liquids can be returned to the booth, also returning expensive water treatment chemicals. Further, hot oven exhaust can be sparged through the tray holding the next batch of sludge to help preheat the sludge and recapture some of the heat energy.

It has also been found that sludge dried by the process of the present invention is more easily crumbled or broken up than sludge processed by conventional thermal techniques. The inventor believes that the reason for this is that the sludge need not be mixed or stirred during heating. Conventional thermal techniques, however, require stirring of the sludge during drying since adequate heat conduction throughout the entire sludge mass will not occur in an economical time period unless mixing is performed. The mixing is believed to detract from the effect of the detackifiers.

An additional advantage of the present invention is a decrease in the VOC-laden gases as a byproduct of processed sludge. This is due to the fact that a greater percentage of sludge liquid is drained off (as opposed to being vaporized) than with other conventional sludge processing techniques utilizing thermal/heat conduction drying. The VOCs that remain in the drained sludge liquid processed by the present invention need not be removed since the drained liquid can be sent back to the booth water. Oven exhaust can also be liquified by a condenser, and then returned to the booth. This is in contrast with VOCs contained within the exhaust gases of conventional sludge processing systems, which typically must be treated, since the gas contents often cannot be completely dissolved into the booth water. Further, exhaust gases with VOCs can also precipitate a "blow-down" condition in the booth. This occurs when the booth is over-laden with VOCs and must be "blown down" or cleaned out.

The components of the present invention are also easily maintained. If sludge solids should solidify into a single mass or "go plastic" during heating, the plastic tray liner containing the sludge can be removed and easily replaced. Also, importantly, the "plasticized" single mass of sludge can be easily taken off-line, crumbled by machine or manual means, and then replaced on-line, without causing a stoppage of the entire processing system, as with prior art processing techniques.

Raw paint sludge from paint spraybooth operations contains on the order of approximately 25% paint solids and 75% water. However, since the present invention can successfully treat paint sludges having any relative percentage of paint solids to water, it will be appreciated that the present invention can be used to treat waste sludge from other sources than paint spraybooths. Those of skill in the art will appreciate, though, that the present invention most efficiently treats sludge having a relatively high water content in relation to solids content.

It will also be appreciated by the foregoing description that the processes of the present invention may be suited to the treatment of various industrial and sanitary sludges other than waste paint sludge.

The foregoing description of the preferred embodiments of the present invention has been presented for purposes of illustration and description. The described embodiments are not intended to be exhaustive or to limit the invention to the precise form disclosed. Obviously many modifications and variations are possible in light of the above teachings. The embodiments which were described were chosen in order to best explain the principles of the invention and its practical applications. It is intended that the scope of the invention, be defined by the following claims, including all equivalents.

I claim:

1. A process for treating paint sludge having both liquid and solid constituents, comprising the steps of:

heating the paint sludge to a minimum optimum draining temperature using a microwave oven, the oven having a metal perforated floor for reflecting microwave radiation, the paint sludge being housed in an open container positioned within the oven, the container including a porous liner arranged adjacent the perforated floor, to permit mechanical draining of liquid from the paint sludge;

mechanically dewatering the paint sludge while maintaining the sludge at the minimum optimum draining temperature and below the volatilization temperature of the sludge; and continued heating of the paint sludge at a temperature above the minimum optimum draining temperature, to volatilize at least a portion of the remaining liquid constituents.

2. The process of claim 1 for treating paint sludge, wherein during the heating step the paint sludge liquid is brought to a boil prior to dewatering.

3. The process of claim 1 for treating paint sludge, wherein exhaust is generated during heating of the paint sludge, and further comprising the step of incinerating the exhaust.

4. The process of claim 3 for treating paint sludge, further comprising the step of sparging the incinerated exhaust through untreated paint sludge prior to its heating, to preheat the untreated paint sludge and conserve heat energy from a prior heating treatment.

5. The process of claim 1 for treating sludge, further comprising the step of grinding or crumbling the sludge following the continued heating step to obtain a desired size and consistency of sludge solids.

6. The process of claim 1 for treating paint sludge, further comprising the step of treating the paint sludge with a chemical prior to the heating step to enhance detackification of the paint sludge.

7. The process of claim 6 for treating paint sludge, wherein the paint sludge is waste from a paint spraybooth and the chemical treatment step includes the addition of a surfactant to the paint sludge.

8. The process of claim 1 for treating paint sludge, wherein the paint sludge is waste from a paint spraybooth, and further comprising the step of conveying the liquid released during mechanical dewatering to the paint spraybooth.

9. The process of claim 1 for treating paint sludge, wherein water vapor is generated during heating of the paint sludge, and further comprising the step of condensing portions of the water vapor into liquid water, and thereby obtaining a treated exhaust containing a higher percentage of VOCs to water vapor than was contained in the exhaust prior to the condensing step.

10. The process of claim 9 for treating paint sludge, further comprising the steps of first incinerating and then sparging the treated exhaust through untreated paint sludge, to preheat the untreated sludge and conserve heat energy from a prior treatment.

11. The process of claim 9 for treating paint sludge, wherein the paint sludge is waste from a paint spraybooth and water vapor is generated during heating of the paint sludge, and further comprising the steps of condensing the water vapor and recycling the condensed liquid back to the paint spraybooth.

12. The process of claim 1 for treating paint sludge, further comprising the step of suctioning the sludge from a position below the container to facilitate mechanical dewatering of the paint sludge.

* * * * *